June 30, 1970

G. J. GIEL ET AL 3,518,628

SYSTEMS AND METHODS FOR COMMUNICATING
WITH A PLURALITY OF REMOTE UNITS

Filed Nov. 10, 1966

GEORGE J. GIEL
LAWRENCE S. SMITH
ROBERT D. VILLWOCK
INVENTORS.

BY
FOWLER, KNOBBE
& MARTENS
ATTORNEYS.

GEORGE J. GIEL
LAWRENCE S. SMITH
ROBERT D. VILLWOCK
INVENTORS.

BY
FOWLER, KNOBBE
& MARTENS
ATTORNEYS.

3,518,628
SYSTEMS AND METHODS FOR COMMUNICATING WITH A PLURALITY OF REMOTE UNITS
George J. Giel, Los Angeles, Robert D. Villwock, Glendora, and Lawrence S. Smith, Alhambra, Calif., assignors to Electronic Specialty Company
Filed Nov. 10, 1966, Ser. No. 593,531
Int. Cl. H04q 9/00
U.S. Cl. 340—167          22 Claims

ABSTRACT OF THE DISCLOSURE

This invention relates to a communication system which includes a central communicator station and a plurality of remote units each of which serves a predetermined system function. The units are all connected to the central station by a single, time-shared communications cable.

---

This invention relates to improved systems and methods for communicating with a plurality of remote units and, in particular, a system in which the plural remote units are connected to a single time-shared communications cable.

Although of general utility, this invention is especially adapted for information acquisition and command in aircraft. Present aircraft include numerous instruments for operational purposes—instruments requiring the accurate measuring of analog parameters such as pressure, temperature, force, displacement, voltage, current and frequency. Further, the aircraft of this era require the transmission of commands, both discrete and proportional, to any location within the craft. Representative examples include the operation of an ON-OFF switch to cause the landing gear to retract—a discrete command—and the manual setting of a potentiometer for servo positioning a trim control—a proportional command.

Traditionally, individual electrical circuits have been used in aircraft for transmission of information and commands. And for good reason, when an aircraft has only a few instruments and commands, it is hard to exceed the simplicity and reliability of a pair of wires. However, in larger modern aircraft, the complexity of instrumentation, large number of commands, and the extensive use of electrical power and equipments result in, literally, thousands of pounds of wire. The situation is further compounded by the electrically noisy environment which demands the extensive use of heavy braided shielding on all sensitive circuits.

While transporting and manitaining the mass of wiring causes the greatest economic problems, the costs of the initial installation of the complex web of conductors are considerable. Further, much of this expensive "cargo" is used only very briefly in the course of a flight. For example, the command to lower the landing gear may be only a few milliseconds long, but the conductors which carry only that command must be carried for the useful life of the aircraft.

The present state of the art relating to data acquisition and command systems is exemplified by the copending application of Carl A. Budde, Ser. No. 416,817, entitled "Data Monitoring System," and the copending application of George J. Giel, a coinventor of this application, Ser. No. 421,511 (now abandoned), entitled "Data Acquisition System," assigned to Electronic Specialty Company, assignee of the present invention.

Briefly, in accordance with a preferred form of the present invention, each of a plurality of remote units serves a predetermined system function. Typically, some of the units will acquire analog data, some will execute discrete commands, and still others will issue proportional command signals. The units are all connected to a central communicator station by a single, time-shared communications cable. This central communicator station selectively addresses remote communicator units during the first portion of the communicating sequence by issuing an encoded address signal on a lead of the communications cable common to all of the remote units. This address signal is compared with a signal produced at each of the remote units in response to the transmission of a time varying reference signal over a second lead of the communications cable common to all of the remote units. That one or ones of the remote units is addressed or "called up," which reproduces a signal coincident in time with the address transmitted from central station. Such addressed unit or units is activated for performing its data acquisition or command function.

The desired system function is performed during the second portion of the communicating sequence. An activated information acquisition unit compares the time varying reference signal with a voltage corresponding to the sensed analog parameter for producing a proportional time-duration signal. An activated discrete control unit produces a discrete command signal when addressed. And, an activated proportional command unit translates a time-duration signal applied to the communications cable during the second portion of the command sequence into a proportional analog command signal at its output.

A significant feature of the invention is that the remote units need not incorporate the circuitry necessary for generating an accurate reference waveform. Instead, a reference signal produced at the central station is supplied to all of the remote units—regardless of their function—over a common lead of the communications cable. Besides materially reducing the overall system complexity and thereby improving the system reliability—a not unimportant consideration in aircraft systems—this feature has the correlative advantage of substantially lowering the overall cost of the system and reducing the physical size and weight of each of the remote units. In a large system having some 250 remote units, a relatively small savings in each remote unit provides an appreciable overall reduction in cost, size and weight.

Another advantage provided by this invention is that the address signals produced at the central station and the data communication signals produced either at a remote communicator unit or in the central communication station may be transmitted over a common lead of the communications cable, thus reducing the size thereof.

Fail safe and self-checking provisions are other significant aspects of this invention. Means are provided for automatically deactivating a remote unit should it fail, and as a result of such failure, tend to ground the address and data lead of the communications cable. The information acquisition units check both themselves and their associated transducer each time they are addressed since they produce a time-duration output signal of predetermined width for zero valued analog input information. Accordingly, if no time-duration signal appears on the address and data conductor when a given information acquisition unit is addressed, this occurrence is a positive indication that either the positive address signal was not received by the address comparator or that the unit itself has failed.

A further advantage of the communications systems of this invention is their adaptability for acquiring a plurality of analog signals, translating such signals into corresponding time-duration signals and transmitting these latter signals over the communications cable, all during a single communicating sequence and with a single information acquisition unit. In this manner, the measurement of ratios between two quantities, e.g. the transducer excitation voltage and transducer output voltage, is greatly facilitated since both quantities may be acquired with a single remote unit during a single communicating sequence.

A more thorough understanding of the present invention may be obtained from the following detailed description taken in connection with the accompanying drawings, in which:

FIG. 1 is a block diagram of an overall system for communicating between a central communicator station and a plurality of remote communicator units constructed in accordance with this invention;

FIGS. 2a, b and c are functional block diagrams of the information acquisition unit, the discrete command unit and the proportional command unit, respectively;

FIGS. 4a, b, c, d, e, f, g, h and i are diagrammatic drawings of idealized waveforms of signals present in the unit of FIG. 3;

FIGS. 7a, b and c are diagrammatic drawings showing input and output waveforms of the unit of FIG. 6;

FIGS. 10a and b are diagrammatic drawings showing the input and output waveforms applied to the unit of FIG. 9;

OVERALL DESCRIPTION OF DATA COMMUNICATING SYSTEM

Figures 1, 2A, 2B, 2C:
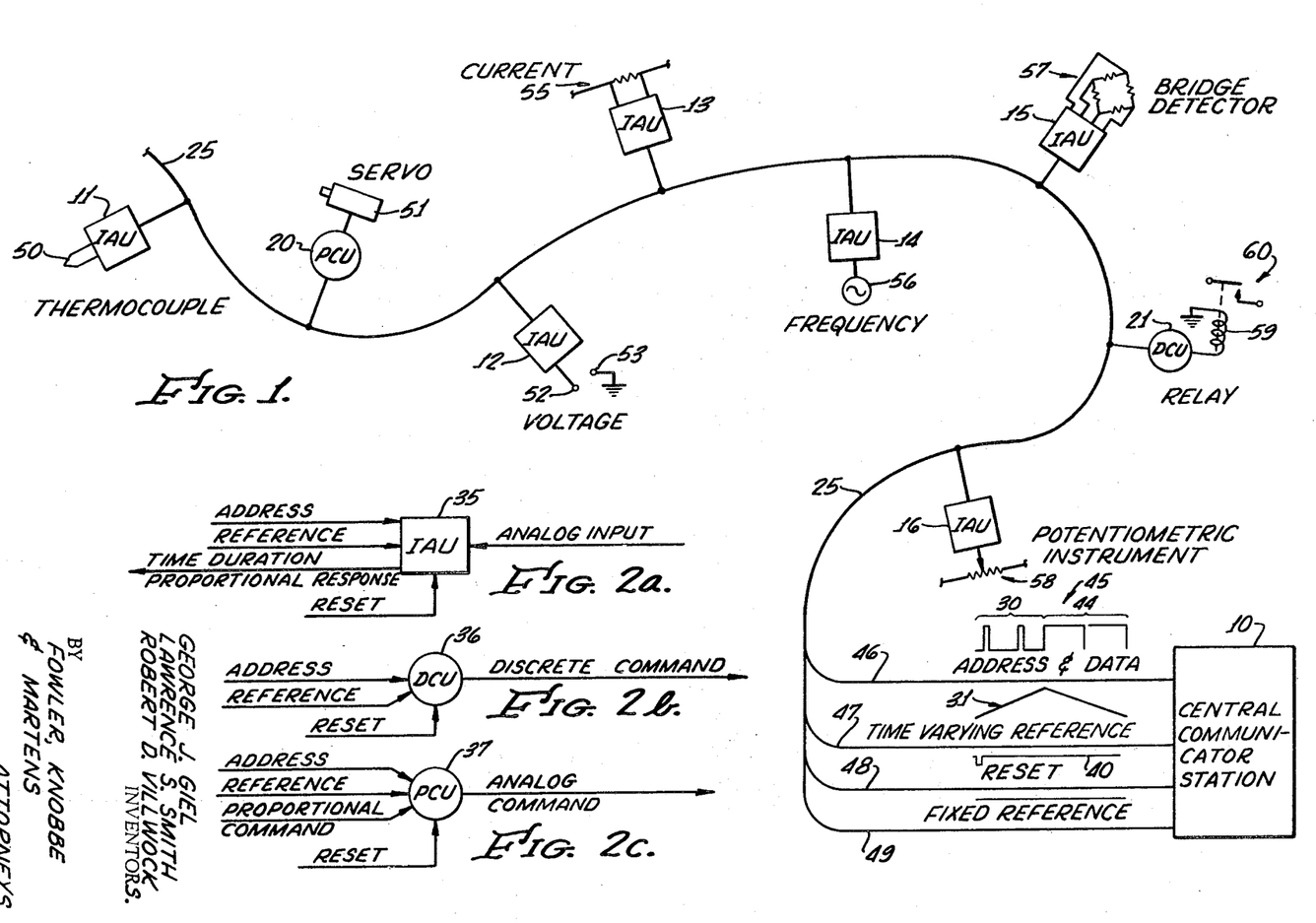

Referring to FIG. 1, a system for communicating with a plurality of remote units comprises a central communicator station 10 coupled to a plurality of remote information acquisition (IAU) units 11, 12, 13, 14, 15; proportional command unit (PCU) 20 and discrete command unit (DCU) 21 all connected to the same communications cable 25. The central station issues simultaneously over cable 25 a first waveform shown as address signal 30 and a second waveform shown as time varying reference signal 31 for activating a particular one of the remote units during a given communicating sequence. The central station is therefore provided with the capability of "calling up" or addressing each remote unit by sending out as many different coded address signals as there are remote units. When the addressed remote unit receives its unique coded address signal, the unit is activated for performing its specified function of acquiring information, issuing a discrete command signal or issuing a proportional command signal.

The functional capabilities of the respective remote units are shown in FIG. 2, FIG. 2a showing an information acquisition time-duration unit (IAU) 35, FIG. 2b showing a discrete command unit (DCU) 36, and FIG. 2c showing a proportional command unit (PCU) 37. The IAU unit is associated with a data source or transducer. The parameter sensed by such device, be it temperature, pressure, force, etc., is converted into an analog signal of appropriate magnitude and transmitted to the IAU via the analog input. The address and time varying reference signals are applied to the IAU unit. When selectively addressed from the central communicator station 10, the IAU linearly transforms the analog input into a proportional time-duration data signal. The DCU unit 36 includes address input and a time varying reference input for receiving the address signal from the central station 10. When addressed, the DCU unit supplies a predetermined discrete command at its output. The PCU unit 37 receives the address and time varying reference signals and also a proportional time-duration command signal from the central station and linearly transforms this time-duration period into an analog command. In addition to these functions, each remote unit includes a reset capability for resetting the unit at the initiation of a communicating sequence. The reset impulse may be produced within the remote unit itself or, as shown in FIG. 1, a reset impulse 40 is supplied to the remote units from the central station over cable 25.

Advantageously, as shown in FIG. 1, the address pulse signal 30 and the time-duration data signal 44 are transmitted from and received by the central station 10 as a composite signal 45 over the same lead 46 of communications cable 25. Cable 25 additionally includes lead 47 over which the time varying reference signal 31 is transmitted to each of the remote units, lead 48 over which the reset pulse is transmitted, and lead 49 over which a fixed reference level is conducted.

Some representative applications of the different remote units are shown in the overall system of FIG. 1. IAU 11 is coupled to a thermocouple 50 so that when unit 11 is addressed from the central communicator station 10, it transmits back to the central station over cable 25 a time-duration data signal proportional to the thermocouple current. PCU 20 is coupled to a servo 51 so that when this unit is addressed, the servo unit is driven an amount proportional to the proportional command signal transmitted from the central station. IAU 12 when addressed provides a time-duration data signal back to the central communicator station corresponding to the voltage connected between its input terminals 52, 53. Similarly, IAU units 13, 14, 15 and 16 are uniquely addressable units for respectively acquiring data from a current source 55, a frequency source 56, a bridge detector 57 and potentiometric instrument 58.

The DCU 21 is shown operatively coupled to relay coil 59. When this unit is addressed from the central station, it produces a discrete command signal in the form of a flow of electrical current through coil 59 resulting in the closing of relay contacts 60.

DETAILED DESCRIPTION OF INFORMATION ACQUISITION UNIT

Adderss circuitry, waveforms and function

Figure 3:
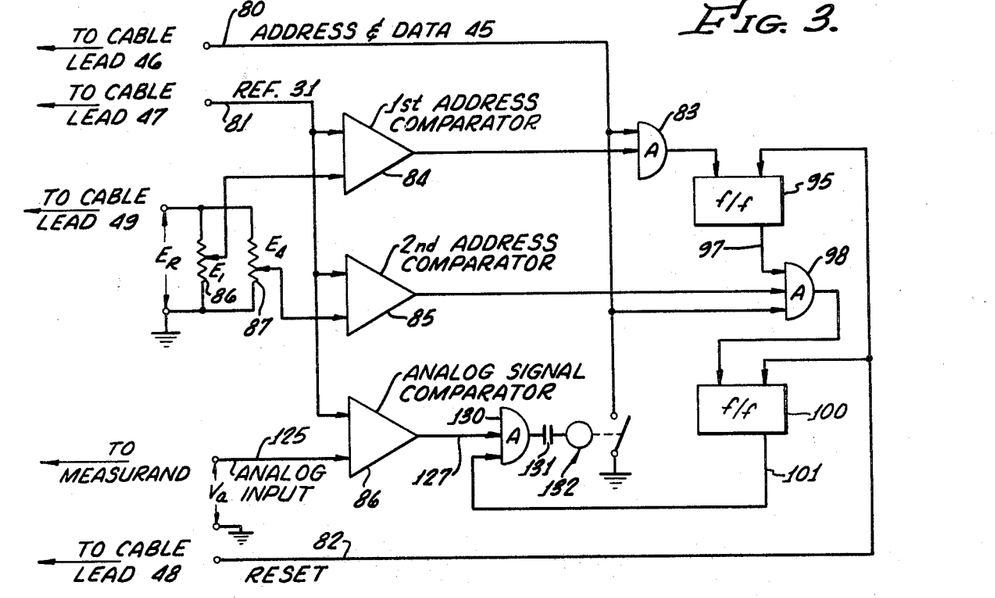
FIG. 3 is a block diagram of an information acquisition unit employed in the system of FIG. 1.

A detailed circuit schematic for one embodiment of an information acquisition unit constructed in accordance with this invention is shown in FIG. 3 and typical waveforms including the address, reference ramp, and internally generated reference signals are shown in FIGS. 4a, b, c, d, e, f, g, h, and i. Irrespective of function, all remote units are addressed in the same manner so that the following description of the address portion of the IAU unit is applicable to PCU and DCU units as well.

Referring to FIG. 4a, each communicating cycle of the composite address and data signal 45 is divided into an address portion 30 and a data portion 44 having representative time lengths of 750 μseconds and 900 μseconds for a total time length of 1650 μseconds. The address information is advantageously contained in a time-duration function which is unique for a selected one or ones of the remote communicator units. In the preferred embodiments of the invention described herein, this time-duration function comprises a selected pair of time intervals within the address portion of the cycle measured from a reference time $t_0$. For example, the address portion shown in FIG. 4a is subdivided into a plurality of time intervals, e.g. $t_1$, $t_2$, $t_3$, $t_4$ and $t_5$. For convenience of illustration, only five such time intervals are shown, but it will be understood that a substantially greater number would be used in an actual communicating system. For example, for a 750 μseconds long address, $t_1$ would typically be 50 μseconds from $t_0$, $t_2$ would be 75 μseconds from $t_0$ with each successive time interval being 25 μseconds longer than the preceding interval. The address function consists of a selected pair of any two of these time intervals $t_1$, $t_2$ ... $t_n$. The address function is produced at the central communicator station 10 and communicated to each of the remote communicator stations by means of the first waveform which is transmitted over lead 46 of the communications cable 25. As described in more detail hereinafter, a feature of this invention is that the comparison between this address function and an address code unique to a particular one or ones of the remote units, while made at the remote unit, is provided by the cooperation of this first waveform with the second waveform, also produced at the central station and transmitted to each remote unit via lead 47 of the communications cable.

The first waveform 45 advantageously comprises a pair of pulses whose positions correspond to the encoded pair of time intervals. Thus, the first address function shown in FIG. 4a comprises the time durations $t_1$ and $t_4$ and the encoding first waveform comprises a first pulse 70 centered at time $t_1$ and a second pulse 71 centered at time $t_4$. The second waveform 31 advantageously comprises an asymmetrical triangular waveform having a linearly rising ramp portion 75 during the address portion of each communicating cycle and a linearly falling ramp 76 during the data communication portion of the communicating cycle. In the preferred embodiments of the invention described herein, waveform 31 serves as a reference signal for each of the remote units so that its waveform varies with time in a known manner during each communicating cycle. Typical voltage levels are shown—the ramp being initiated at −30 volts and positively increasing in value to +3.75 volts.

The data portion of the communicating cycle follows the address portion and is initiated at the central station 10 by a step change in signal level on the address and data lead as shown at 72. The data acquired by the IAU units or the proportional command transmitted to the PCU units is transmitted as a proportional time duration $t_a$, measured from $t_r$ defined by the signal step 72 and a momentary drop in signal level as shown at 73.

The reset signal is shown in FIG. 4c and comprises a series of reset pulses 40 coincident with the initiation of each communicating sequence.

The composite address and data signal 45 on cable lead 46 and triangular reference signal 31 on cable lead 47 are respectively supplied to input leads 80 and 81 of each remote unit, as shown in FIG. 3. The reset signal pulses 40 on cable lead 48 are supplied to input lead 82. The address signal 45 is conducted to one input of AND gate 83 and reference signal 31 is supplied to respective inputs of the first address comparator 84, the second address comparator 85, and the analog signal comparator 86. Additional inputs to the first and second address comparators 84, 85 comprises preset voltage levels $E_1$ and $E_4$ potentiometrically obtained with potentiometers 86, 87 from the fixed reference ($E_r$) on cable lead 49.

Each of the address comparators are designed to provide an output pulse when the triangular reference ramp 31 is rising during the address portion 30 and is equivalent in magnitude and opposite the polarity to the other signal applied thereto. The analog signal comparator is designed to provide an output pulse when the triangular reference ramp is falling during the data portion 44 and is equivalent in magnitude and opposite in polarity to the other signal applied thereto. By way of specific example, these comparators may comprise linear, high gain amplifiers having a pulse forming network at their output such as a differentiating circuit and a diode poled to transmit only the desired polarity pulses. Referring to FIG. 4b, at time $t_1$ the triangular ramp is rising and equivalent in magnitude and opposite in polarity to the present level $E_1$. Accordingly, during the first communicating sequence shown, the first address comparator 84 supplies one output pulse 90 at time $t_1$ to one input of AND gate 83 (FIG. 4d). This pulse occurs during the time interval of the first address pulse 70 (applied to the other input of AND gate 83) so a pulse is gated through the then opened AND gate 83 and applied as a trigger to the input of flip-flop 95, resulting in a step rise 96 on flip-flop output 97 and a corresponding positive input to a second AND gate 98 (FIG. 4e).

The second preset voltage lead $E_4$ is lower in magnitude than the first level $E_1$ so that this second voltage coincides in magnitude with the rising ramp 75 at a later time $t_4$. If, as shown in the first communicating sequence of FIG. 4, the pulse output 99 of the second address comparator 85 (FIG. 4f) occurs during the second defined gating interval provided by second address pulse 71, all three inputs of AND gate 98 are high at the same instant of time ($t_4$) and AND gate 98 opens, resulting in the application of a trigger pulse to flip-flop 100. The output 101 of flip-flop 100 then rises as shown at 102 in FIG. 4g and remains at the level during the data portion of the communicating sequence.

As described in more detail below, energization of the output 101 of flip-flop 100 signifies that the remote unit has been properly addressed and this output is used for appropriate control functions in the IAU, DCU and PCU units. For example, energization of output 101 in the IAU unit of FIG. 3 enables analog data information to be transmitted as the time duration $t_a$ over cable 25.

The reset pulse 40 occurring at the start of the next communicating sequence resets both of the flip-flops 95 and 100 to their original state as shown at 103 and 104. AND gate 98 is then closed and the address portion of the communicating sequence repeated for the particular address code transmitted from central control.

Figure 4:
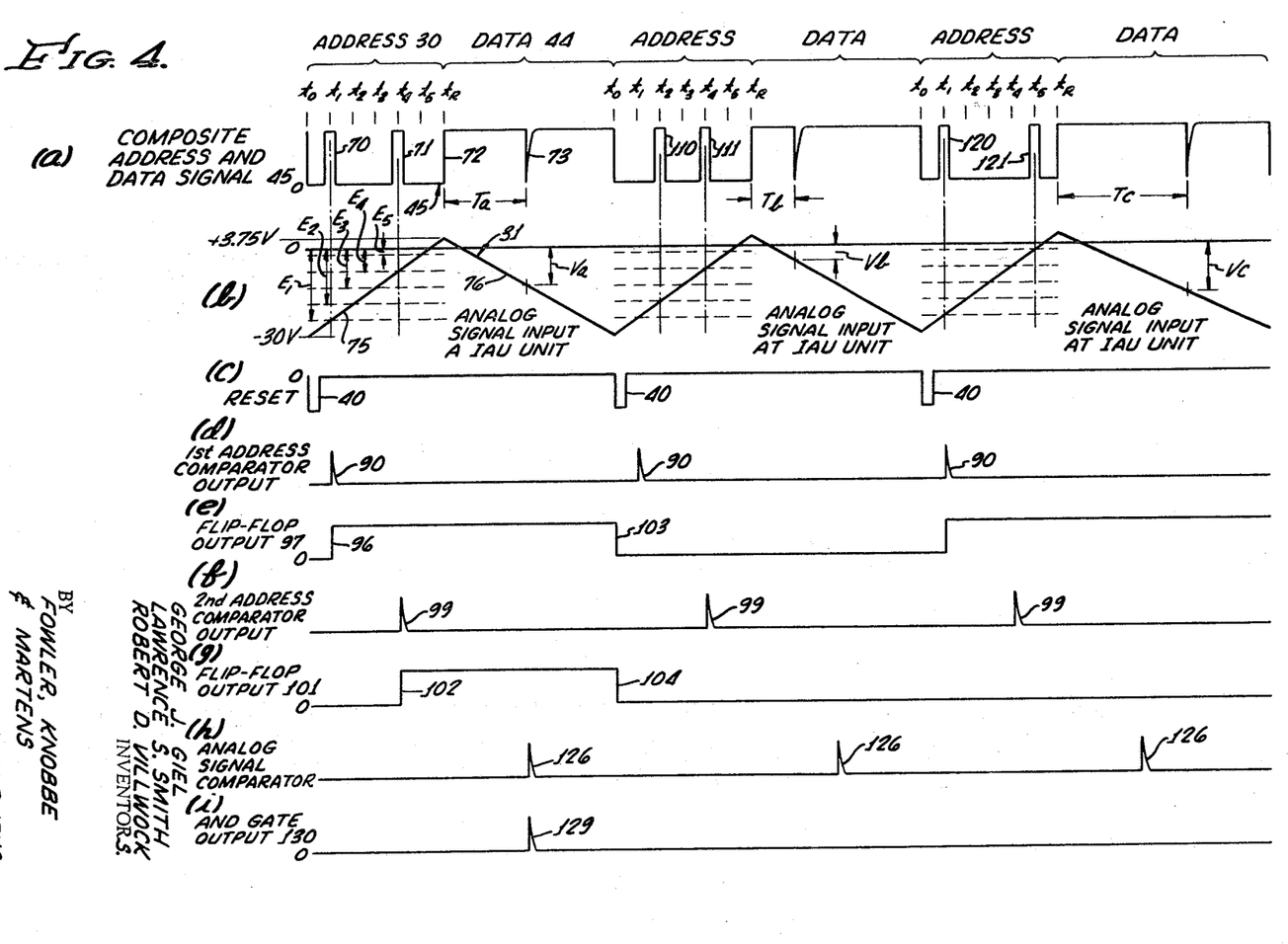

The manner in which each IAU is responsive to one and only one discrete address code is further illustrated in the second and third communicating sequences shown in FIG. 4. Thus, the second sequence shown includes an address code formed by address pulses 110, 111 at times $t_2$ and $t_4$, respectively. However, the output pulse 90 from the first address comparator 84 of the IAU of FIG. 3 occurs at time $t_1$ or prior to the first address pulse 110 so that flip-flop 95 remains in its reset state. Therefore, no pulse is gated through AND gate 83, preventing triggering of either of the flip-flops 95 or 100 which remain in their reset states. Thus, even though the output pulse 99 from the second address comparator 84 occurs during the gating interval defined by the second address code, gate 98 remains blocked by ground potential on flip-flop output 97. Instead, another of the IAU units connected to the communications cable 25 responds to the unique address of $t_2$, $t_4$ and transmits the data time duration $t_b$.

In like manner, the address comprising respective address pulses 120 and 121 at times $t_1$ and $t_5$ fails to activate the IAU unit of FIG. 3. Although the first address pulse 120 and the output 90 of the first address comparator 84 occur in coincidence to trigger input flip-flop 94, no pulse is applied to the AND gate 98 from the second address comparator 85 during the gating interval defined by the second address pulse 121. Accordingly, flip-flop 100 remains in its reset state and another IAU unit uniquely addressed by the address code pulses 120, 121 is activated and provides the data transmitted time duration $t_c$.

It will thus be seen that a time function unique to each of the remote units is compared with the time function generated at the central communicator station by the cooperation of the first and second waveforms generated at the central station and transmitted to each of the remote stations, one of these waveforms being varied in accordance with the address encoding and the other of the waveforms serving as a reference signal which is varied in a fixed, predetermined manner during each cycle. As a result, the remote unit of FIG. 3 does not incorporate any circuitry for generating a time varying waveform, thereby both reducing the complexity of this unit and also reducing its physical size and weight.

Another feature of the address system of FIGS. 3 and 4 is that the width of each address pulse provides the necessary tolerance for address comparison purposes while preventing overlap between adjacent addresses. A typical value of width for this pulse is 10 μseconds with the spacing between the centers of adjacent address pulses being 25 μseconds. This tolerance control is entirely achieved by controlling the width value at the central station and maintaining the pulse configuration through use of an appropriate coaxial or equivalent line for transmission to the several remote units. The advantages of the system shown will be apparent when it is considered that similar width control at each of the remote units would require a pulse forming stage such as a one-shot multivibrator at every one of the remote units. In large systems having 200 or more remote units, this additional circuitry would be quite disadvantageous.

Analog information acquisition

The information bearing analog signal is coupled to input lead 125 and compared with the triangular reference 31 in the analog signal comparator 86 (FIG. 3), producing a pulse 126 (FIG. 4h) on comparator output lead 127 each time the ramp is falling and the respective signals have equivalent magnitudes and opposite signs. Referring to FIG. 4a, during the data portion of the first monitoring sequence, the analog signal input $V_a$ is equivalent in magnitude and opposite in sign with the falling reference ramp 76 at time $t_a$ subsequent to the voltage step 72. As a result, pulse 126 is applied at the output 127 of the analog signal comparator to one input of the AND gate 130. The other input of this AND gate is connected to flip-flop output lead 101 which was previously energized with a positive potential during the address portion of the sequence. As a result, a pulse 129 (FIG. 4i) is produced at the output of AND gate 130, which pulse is transmitted through coupling capacitor 131 to energize switch 132 for momentarily grounding IAU input lead 80 and the address and data cable line 46. The brief grounding of the address and data line produces the signal 73 which occurs at a time $t_a$ after the initiation of the data sequence of $t_r$, the time duration $t_a$ being directly proportional to the magnitude of the measured signal $V_a$.

As shown in FIG. 4h, the pulse 126 is produced at the output of analog signal comparator 86 during the data portion of each sequence, although this IAU is only addressed by the first address pulse pair 70, 71. The pulses 126 which are produced within the non-addressed IAU units do not effect the system operation since AND gate 98 remains blocked until the unit receives the proper address pulses sequence.

In overall operation, the information acquisition unit of FIG. 3 responds to a unique address code received from the central station during the address portion of the communicating sequence. When so addressed, a sensed analog potential corresponding to a measured phenomenon is converted into a time-duration signal during the data portion of the sequence which is transmitted to the central station over the identical lead of the communication cable that carries the address signals.

It will be seen that the triangular reference signal 31 produced at the central station 10 is supplied to all of the remote units, regardless of whether their system function is acquisition, discrete command or proportional command. Accordingly, these units are not required to include any circuitry for generating an accurate reference waveform. Further, as previously noted, precise control over the gates of the respective remote units is achieved by accurately defining at the central communicator station the width of the address pulses, which in turn control the open time of the address AND gates at the remote communicator units and thus define the system tolerance which prevents a remote unit from being called up by an address code other than the one to which it is preset.

DISCRETE COMMAND UNIT

Figure 5:
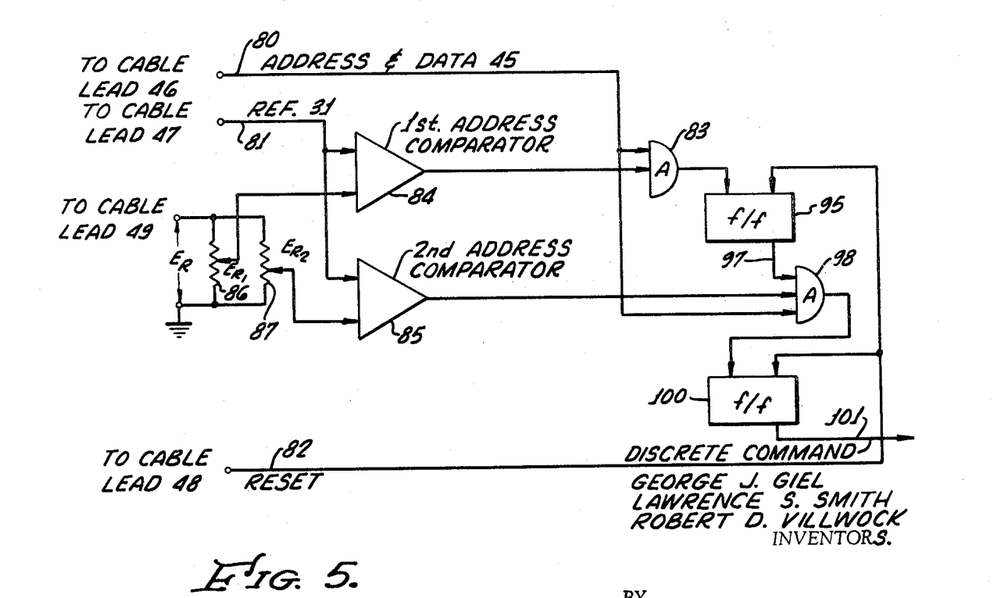
FIG. 5 is a block diagram of the discrete command unit incorporated in the communicator system of FIG. 1.

The discrete command unit (DCU) is shown in schematic form in FIG. 5. As is noted above, the address portion of the respective remote units is the same regardless of their function, and accordingly the DCU unit includes first address comparator 84, a second address comparator 85, AND gate 83, flip-flop 95, AND gate 98 and flip-flop 100. For convenience, each of these circuit elements bears the same reference numeral of the IAU unit of FIG. 3. The elements are interconnected together and coupled to the address and data lead 46, triangular reference lead 47 and fixed reference lead 49 in the manner of the IAU unit of FIG. 3.

The operation of the DCU unit is as follows: flip-flop 95 is triggered when the first address pulse is coincident in time with the pulse resulting from the comparison of the rising reference ramp and higher of the preset voltages ($E_{R1}$). The unit is addressed if the second address pulse is coincident in time with the pulse resulting from the comparison of the rising reference ramp and the lower of the preset voltages ($E_{R2}$). When the unit has been addressed by central station, AND gate 98 is opened and a trigger pulse is applied to the set input of flip-flop 100. The output lead 101 of this flip-flop is then energized and may be used directly as the desired discrete command or applied to a succeeding driver stage (not shown) for providing a control over any condition adopted for a binary ON-OFF command.

PROPORTIONAL COMMAND UNIT

Figure 6:
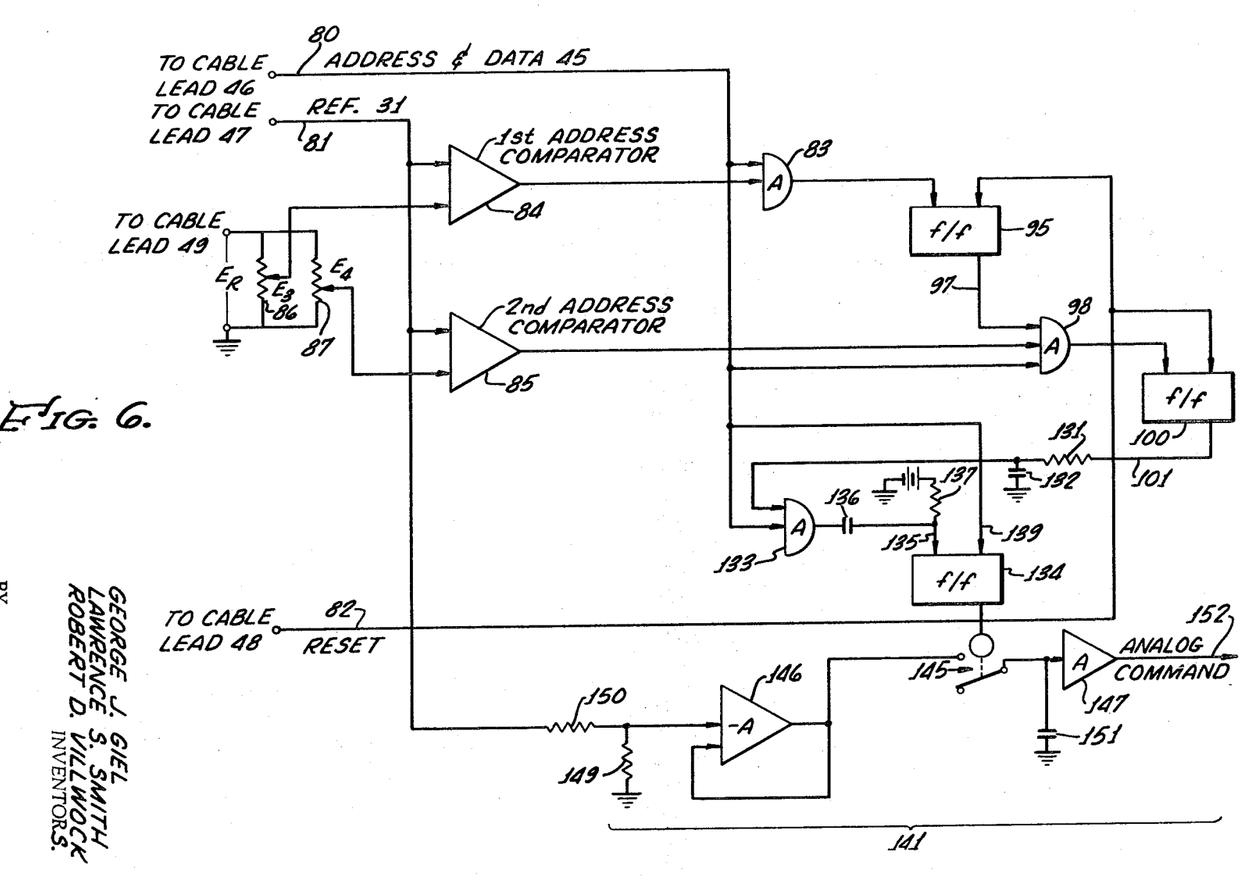
FIG. 6 is a block diagram of the proportional command unit incorporated in the communicator system of FIG. 1.

The proportional command unit shown in schematic form in FIG. 6, includes the same address circuitry as described hereinabove. The output 101 of flip-flop 100 is connected through a delay network comprising series resistance 131 and shunt capacitor 132 to one input of AND gate 133. The other input of this AND gate is connected to the address and data input 80. A third flip-flop 134 has its set input 135 connected to the formed output of AND gate 137 via series capacitor 136 and shunt resistor 137 and its reset input 139 connected directly to the address and data input 80 The output of flip-flop 134 is operatively connected to a switch 145 of sample and hold stage 141 comprising the two amplifiers 146 and 147, resistive network 149 and 150, capacitor 151 and the analog switch 145 such that switch 145 is closed when flip-flop 134 is triggered to its set state and opened when in its reset state. The output of inverting, unity gain amplifier 146 is connected to the input of non-inverting, unity gain amplifier stage 147 through swich 145. The input to the inverter stage 146 is connected to the summing junction of a pair of input resistors 149 and 150, the first of which is connected to the triangular reference input 81 and the other of which is grounded. A storage capacitor 151 is connected in shunting relationship with the input of the second amplifier stage 147. The proportional or analog command signal appears on the output 152 of this amplifier.

Switch 145 is advantageously provided as a fast semiconductor switch for reducing the switching time of the sample and hold stage. Amplifier 147 is preferably of the type which has a very high input resistance, thereby reducing the load on capacitor 151 so that it will maintain its charge for an extended period of time.

The operation of the proportional control unit is as follows, reference being made to the waveforms of FIGS. 7a, 7b, and 7c: flip-flop 134 is reset during the portion of each address communicating sequence, if not already reset, by the address and data input 45 applied to reset signal lead 139, assuring the opening of switch 145 if it had previously been closed. Capacitor 151 then normally is coupled to the high input impedance of amplifier 147 with switch 145 open. The output of the second amplifier stage is then at the initial potential caused by the charge on the capacitor (FIG. 7c), retained from the previous sequence when the unit was addressed. When the PCU unit is addressed from the central communicator station, the AND gate 133 is partially enabled as a result of the delayed rise in potential from flip-flop output lead 101. Subsequently, at time $t_r$—the time at which the data portion of the sequence is initiated—the rise in voltage of the address and data input lead 80 opens AND gate 133 and a delayed trigger pulse is applied to set input 135 causing flip-flop 134 to be triggered to its set state. The voltage on its output lead 141 then rises, causing switch 145 of the sample and hold stage to close.

Figure 7:
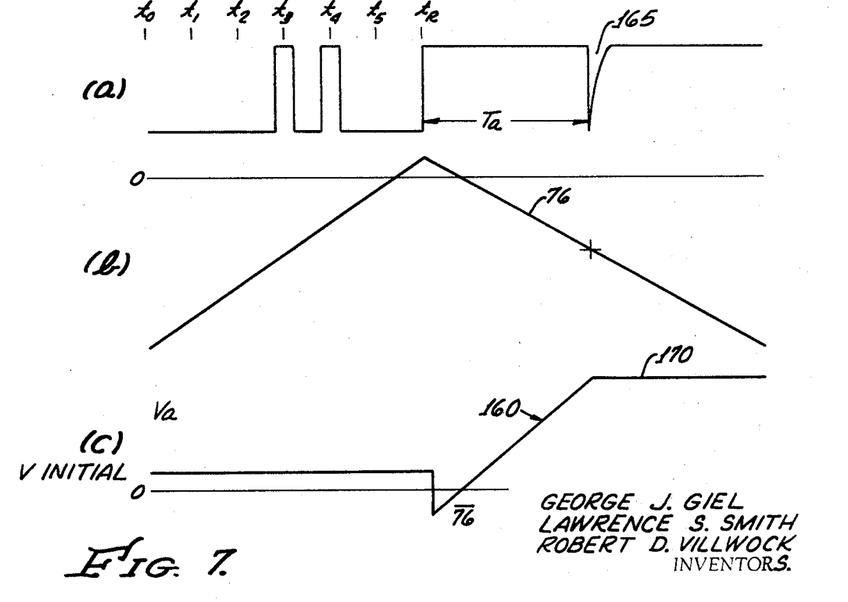

When switch 145 closes, storage capacitor 151 is connected through inverting amplifier 146 to the falling ramp 76 of the triangular reference signal 31 (FIG. 7b). The charge on storage capacitor 151 follows this ramp (inverted by amplifier stage 146) resulting in the output shown in FIG. 7c, wherein the output potential initially drops to below zero a predetermined time delay after $t_r$ (ramp 76 then having a positive value) and then rises linearly as shown at 160 as ramp 76 decreases in value. Switch 145 remains closed until application of a data signal on the dress and data input 80 at which time the potential on this lead momentarily goes to ground potential as shown at 165 in FIG. 7a. The negative going wave 165 is applied at the reset input 139, causing flip-flop 134 to reset. Lead 141 is then grounded and switch 145 opens. Capacitor 151 holds its charged value after the switch is opened, the level of charge being proportional to the ramp potential just before the switch is opened. The output of amplifier 146 is a sufficiently low impedance so that energy transference can occur in either direction—the capacitor will thus be charged if the new ramp potential is higher than the preceding value held by the capacitor or discharged through the low impedance output of amplifier 146 if the new ramp potential is lower than the preceding value held by the capacitor. As a result, a potential 170 (FIG. 7a) is applied at the output of amplifier 147 having a magnitude directly proportional to the timed duration $t_a$ between the time $t_r$ and the data pulse 165.

The delay circuit comprising resistor 131 and capacitor 132 obviates any possibility of a "race" condition opening AND gate 133 upon coincidence between the second address pulse and the rise in potential on lead 101 resulting from the application of the second address pulse. Rather, the rise in potential on lead 101 is delayed a sufficient length of time so that the second address will have terminated prior to the enabling of AND gate 133 by flip-flop 100. Accordingly, the delay circuit insures that the flip-flop 140 will be triggered to its set state only a predetermined time following time $t_r$.

The data pulse 165 which controls the proportional control unit may be produced at the central communicator station by momentarily grounding or interrupting the voltage applied to the data and control cable lead 46 during the data portion 44 of the communicating sequence or it may be provided from an information acquisition unit which shares the same address as the PCU unit. This latter combination is shown in a representative application in FIG. 8, wherein physically separated information acquisition unit 175 and a proportional control unit 176 are connected to the communications cable 25. Both units are responsive to the same address code produced at the central station. When the IAU unit 175 is addressed, it converts the pressure-dependent potentiometer voltage $V_a$ into a time-duration signal in accordance with the system of FIG. 3 described hereinabove. The proportional control unit 176, being responsive to the same address code, reconverts this time-duration data signal produced at IAU 175 into an analog signal at its output 177 for driving the voltage responsive pressure indicator 178. The charged capacitor in the PCU 176 (capacitor 151 in FIG. 6) preserves the analog level until the two units 175 and 176 are again addressed. Accordingly, meter 178 displays a value which is directly related to the analog pressure data acquired by information acquisition unit 175.

Figure 8:
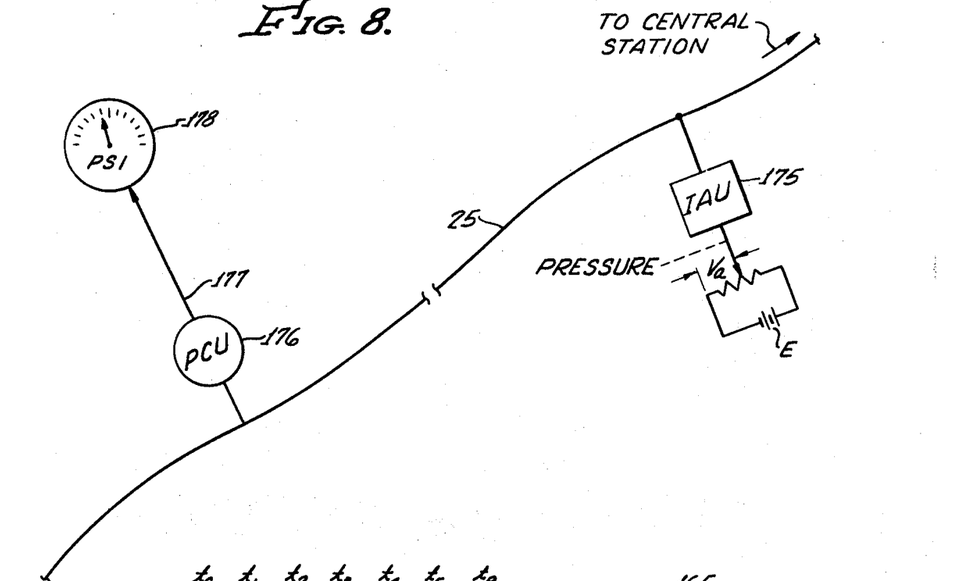
FIG. 8 is a block diagram illustrating the combination of an information acquisition unit and a proportional command unit.

In addition, the example of FIG. 8 illustrates the time sharing concept provided by the present invention. Thus, the communication cable 25 is used for this data transmission for only a very short period of time, typically less than 1/600 of a second—leaving ample time for a plurality of other acquisitions and commands to be performed by other remote units (not shown in this figure) connected to the cable 25.

PLURAL DATA SIGNAL ACQUISITION

Figure 9:
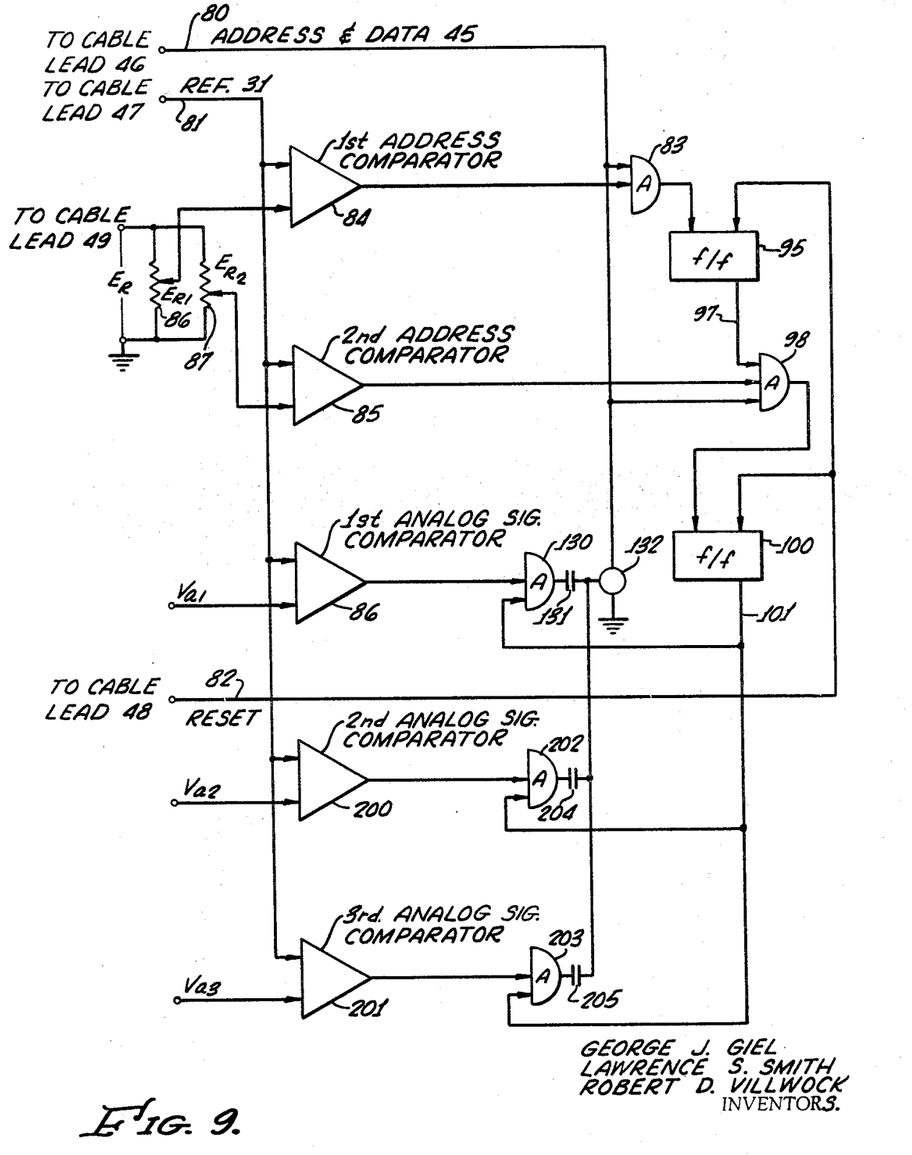
FIG. 9 is a block diagram of an information acquisition unit adapted for receiving a plurality of analog data signals.
Figure 10:
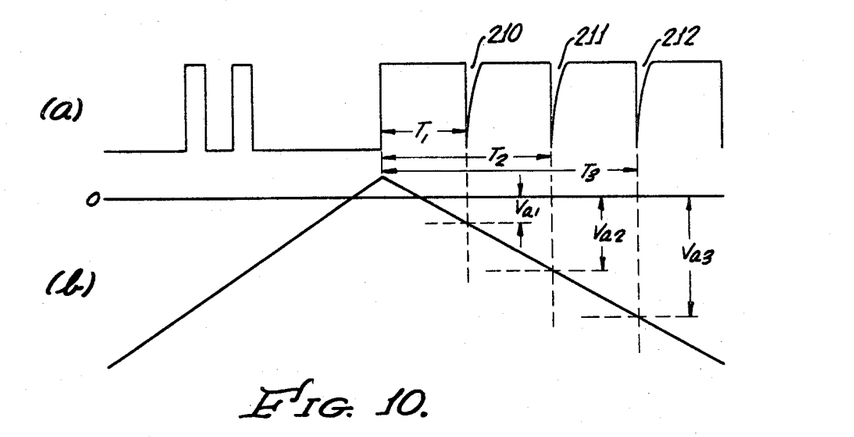

A further embodiment of an acquisition unit constructed and performing as shown in FIGS. 9 and 10 enables acquisition of a plurality of analog data signals during one sample period. Again, the same nomenclature is used to identify those elements which may be the same as the IAU of FIG. 3. The unit of FIG. 9 includes both the first analog signal comparator 86 and additional second analog signal comparator 200 and third analog signal comparator 201. Each of these latter comparator units is coupled via respective AND gates 202, 203 and coupling capacitors 204, 205 to the input of switch 132. When the unit is properly addressed and the voltage on the output 101 of flip-flop 100 rises, each of the AND gates 130, 202 and 203 are opened so that a plurality of analog data signals $V_{a1}$, $V_{a2}$ and $V_{a3}$ may be acquired and translated into proportional time durations $t_1$, $t_2$ and $t_3$ (FIG. 10) during one communicating sequence. Thus, the first data pulse 210 defines a time duration $t_1$ proportional to the analog voltage $V_{a1}$ applied to the first analog signal comparator 86, the second pulse 211 represents a time duration $t_2$ proportional to the voltage $V_{a2}$ applied to the second analog signal comparator 200, and the third data pulse 212 represents a time duration $t_3$ proportional to the voltage $V_{a3}$ applied to the third analog signal comparator 201.

One application for the system of FIG. 9 is ratio measurement. For this purpose, the excitation voltage E of a transducer, e.g., the excitation voltage applied to the pressure transducer of FIG. 8, is connected to one of the analog signal comparators and the transducer output $V_a$ connected to another of the analog signal comparators. Each of these values is translated into a proportional time-duration in the manner described. The computational facility at the central station may then relate the digitized values provided by these respective time-duration data intervals for calculating the ratio between the respective quantities.

Another useful function of the system of FIG. 9 is for acquisition of plural analog signals each occupying a different range of magnitudes. For example, the analog signal applied to the first analog signal comparators may have a magnitude in the range of zero to +0.9 volt, the second analog signal applied to the second analog signal comparator may have a range between +1.0 and +1.9 volts, and the third analog signal applied to the third analog signal comparator may have a range between +2.0 and +2.9 volts. The boundaries between each of the signals insure that the respective data signals occupy discrete portions of the data interval of the communicating sequence. Plural analog data signals are thus acquired by a single IAU during a single communicating sequence.

Figure 11:
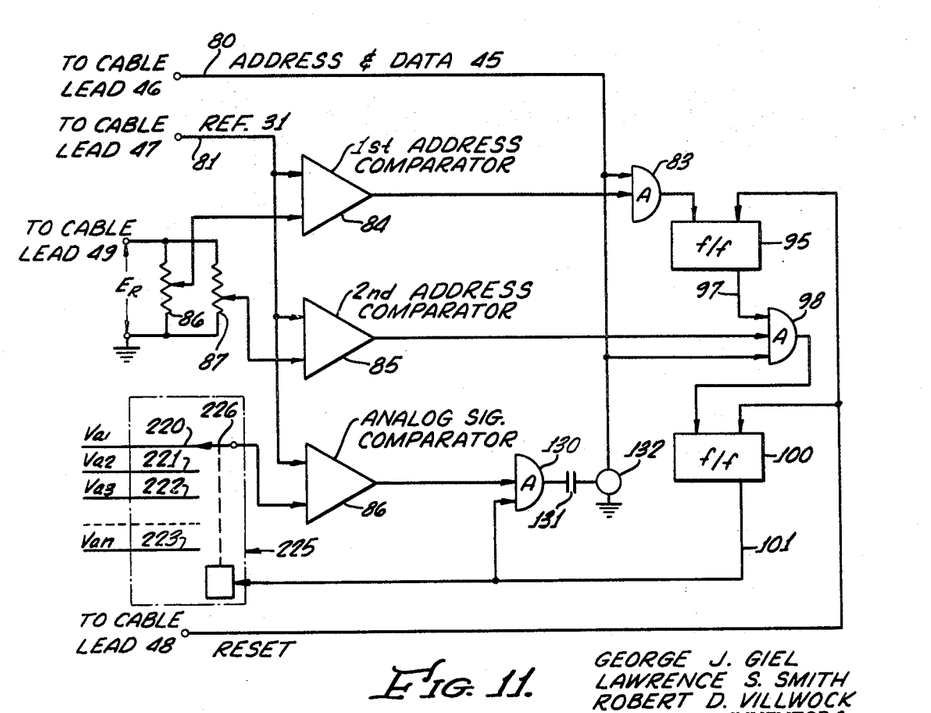
FIG. 11 is a block diagram of an information acquisition unit including a multiplex arrangement for detecting a plurality of analog data signals upon successive addressing of the unit.

Another arrangement for measuring multiple analog signals is shown in FIG. 11 wherein a plurality of analog inputs $V_{a1}$, $V_{a2}$, $V_{a3}$ ... $V_{an}$ are connected to respective contacts 220, 221, 222 and 223 of a mutliplexer switch 225 (advantageously formed by semi-conductor elements for high speed switching) and sequentially connected by switch 226 to the analog input of the analog signal comparator 86. Each time the IAU is addressed and the voltage on flip-flop output 101 rises, switch 225 is caused to translate to its next switch position, thereby acquiring all four analog inputs on successive addressing of a single remote unit. Thus, the first time the unit is addressed, the time-duratioin data signal applied to the address and data input 80 corresponds to the magnitude of the analog signal $V_{a1}$ applied to switch contact 220. When the unit is addressed a second time, the time-duration signal corresponding to the second analog signal $V_{a2}$ at contact 221 is applied to data input 80. In like manner, the third and fourth times the unit is addressed, it produces time-duration data signal on input 80 corresponding to respective analog signals $V_{a3}$ and $V_{a4}$ on leads 222 and 223 respectively.

SELF-CHECKING BY THE INFORMATION ACQUISITION UNIT

Referring to FIG. 4b, is will be noted that the falling ramp 76 passes through zero volts at a predetermined time period $T_0$ after the initiation of the data portion of the communicating sequence at time $t_R$. If the voltage applied at the analog signal input 125 of the analog signal comparator 86 (FIG. 3) is also zero, a pulse output will be applied at the output of this comparator at time $T_0$, resutling in a momentary grounding of the data signal 45. It will thus be seen that a time-duration signal is produced by the information acquisition unit both for positive values of the analog input signal and also when the signal is zero. Accordingly, if no signal is received by the central station when it has addressed a predetermined information acquisition unit, a positive indication is given that either the address was not received or that the address unit is faulty, since it failed to return any data.

ANOTHER EMBODIMENT OF THE INFORMATION ACQUISITION UNIT

Figure 12:
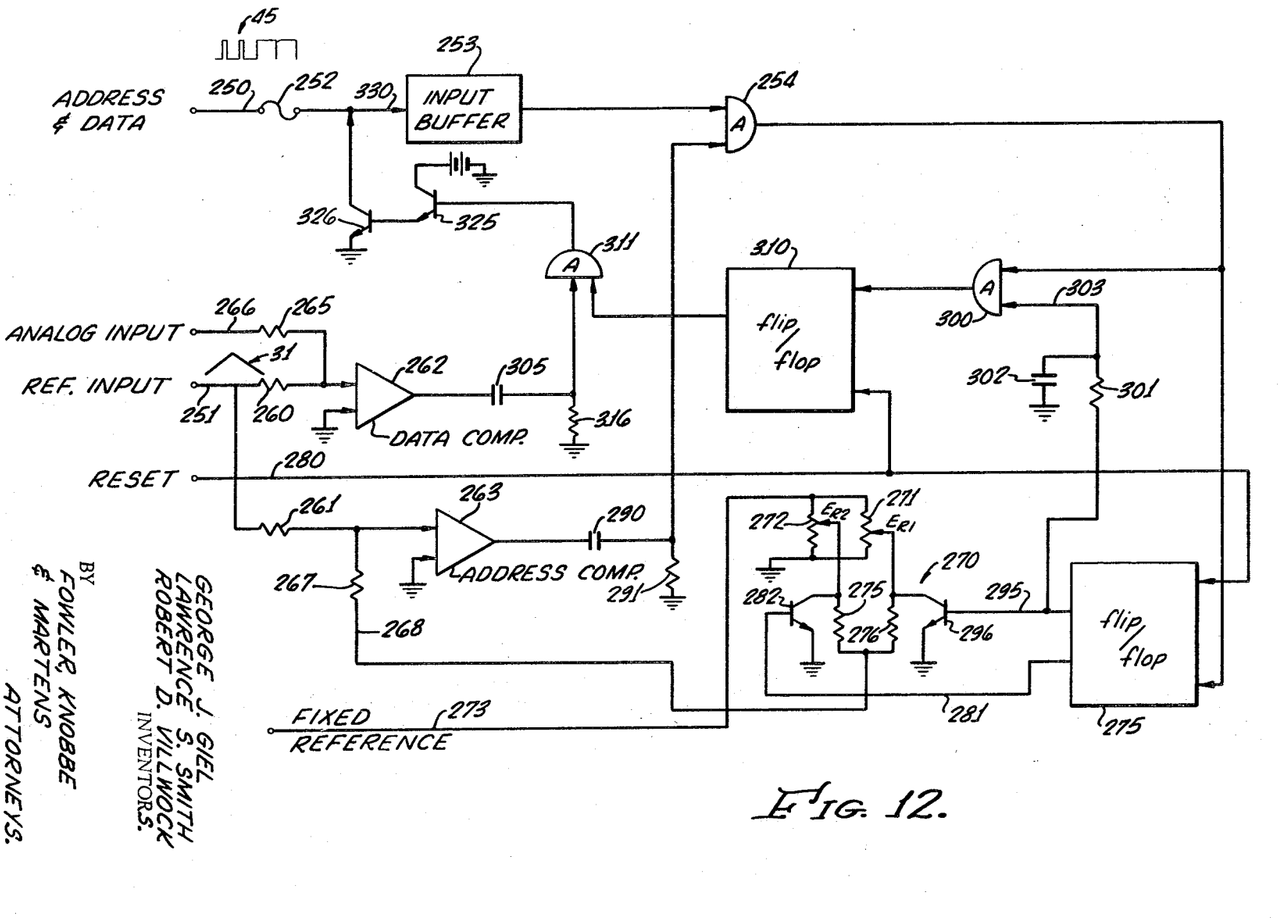
FIG. 12 is a detailed block diagram of another embodiment of the information acquisition unit.

A detailed schematic of another embodiment of the information acquisition unit is shown in FIG. 12, having input leads 250 and 251 to which are respectively applied the composite address and data signal 45 and triangular reference signal 31. Signal 45 is conducted through a series connected fuse 252 or other overload sensitive device and input buffer stage 253 to one input of AND gate 254.

The time varying triangular reference signal 31 is applied to the inputs of respective summing resistors 260 and 261 coupled to respective inputs of a data comparator 262 and an address comparator 263. The other input of each comparator is grounded. Each of these comparators advantageously comprises a linear high-gain open-loop amplifier. Another summing resistor 265 is connected between the analog signal input lead 266 and the grid of the data comparator and another summing resistor 267 is connected between the output 268 of the address reference selector stage 270 and the grid of the address comparator 263. The time varying nature of the reference signal 31 is such that the difference between this signal and the respective analog input or preset reference is initially negative and saturates the comparator amplifier. The amplifier remains saturated until the difference between the reference input and the other signal applied to the comparator becomes positive. The output of the amplifier then increases as a step function. This function is differentiated and used as a control pulse in the remainder of the circuitry.

The address reference selector 270 includes respective parallel connected potentiometers 271, 272 connected between the fixed reference on lead 273 and ground. Respective outputs of these potentiometers are summed by summing resistors 275 and 276 and connected back to the summing resistor 267 of the address comparator. When the flip-flop 275 is reset upon application of a reset pulse to lead 280, a positive potential is applied to its output lead 281 causing transistor 282 to conduct. Since this transistor shunts the summing resistor 275 connected to the second potentiometer arm, the voltage applied to the input summing resistor 267 corresponds to the first potentiometer 271 whose output is preset to $E_{R1}$.

The operation of the system of FIG. 12 is as follows: As in the previously described embodiment of FIG. 3, the first address pulse defines a preset period of time during which the first AND gate 254 is open. If during this time, a coincident pulse is produced at the output of the differentiating circuit comprising series capacitor 290 and series resistor 291 connected to the output of the address comparator, a pulse is applied at the output of AND gate 254 to the set input of flip-flop 275 triggering a change of state thereof. Output elad 295 is then made positive and output lead 281 is grounded, resulting in conduction of transistor 296 and non-conduction of transistor 282. As a result, the second potentiometer 272 preset to voltage $E_{R2}$ is enabled upon coincidence of the first address pulse and the internally generated pulse. The unintentional attenuation of the input of second AND gate 300 between the output on lead 295 of flip-flop 275 and the pulse at the output of AND gate 254 (sometimes referred to in the art as a "race" condition) is prevented by a delay circuit comprising series resistor 301 and shunt capacitor 302. The values of these components are selected so that when flip-flop 275 is triggered to its set state, the voltage on the AND gate input lead 303 rises prior to the second address pulse.

The second address pulse likewise defines an opened time interval for the AND gate 254 and the address comparator 263 provides a second comparison within the signal address period by comparing the time varying reference 31 and the output derived from the second preset potentiometer 272. If the pulse at the output of the address comparator coincides in time with the second address pulse, a second pulse is provided at the output of AND gate 254. AND gate 300, having been previously opened by the positive signal on output lead 295 of flip-flop 275, allows this pulse to be applied to the set input of flip-flop 31 (which corresponds in function to flip-flop 100 of the IAU unit of FIG. 3). When this flip-flop is set, AND gate 311 is enabled.

During the data portion of the communicating sequence, a comparison between the analog signal input at input 266 and the triangular reference 31 at input 251 results in a positive voltage step at the output of data comparator 262 which is differentiated by series capacitor 305 and shunt resistor 316. The resultant positive pulse is conducted through the then open AND gate 311 (assuming the unit to have been addressed) to the base of a first transistor switch 325, causing this transistor to conduct and in turn drive a second transistor switch 326 into conduction. The collector and emitter electrodes of this latter transistor are connected in shunt with the address and data input lead 250 so that when this transistor is caused to momentarily conduct by the differentiated output of the data comparator, the address and data line is momentarily grounded, thus producing the desired time-duration signal on the communications cable.

FAILSAFE FEATURE

The fuse 252 of the system of FIG. 12 provides a failsafe provision in case of a catastrophic failure within the information acquisition unit. Thus, should such a failure result in the grounding of lead 330 connected to the input buffer stage 253, the fuse blows during the 55–60% duty cycle of positive potential applied during the data portion of the communicating sequence. Inadvertent firing of the fuse is avoided by selecting a sufficiently high rating so that the fuse is insensitive to the momentary grounding of the lead by transistor 326 during data transmission, such grounding requiring less than 1% duty cycle.

CENTRAL COMMUNICATOR STATION

Figure 13:
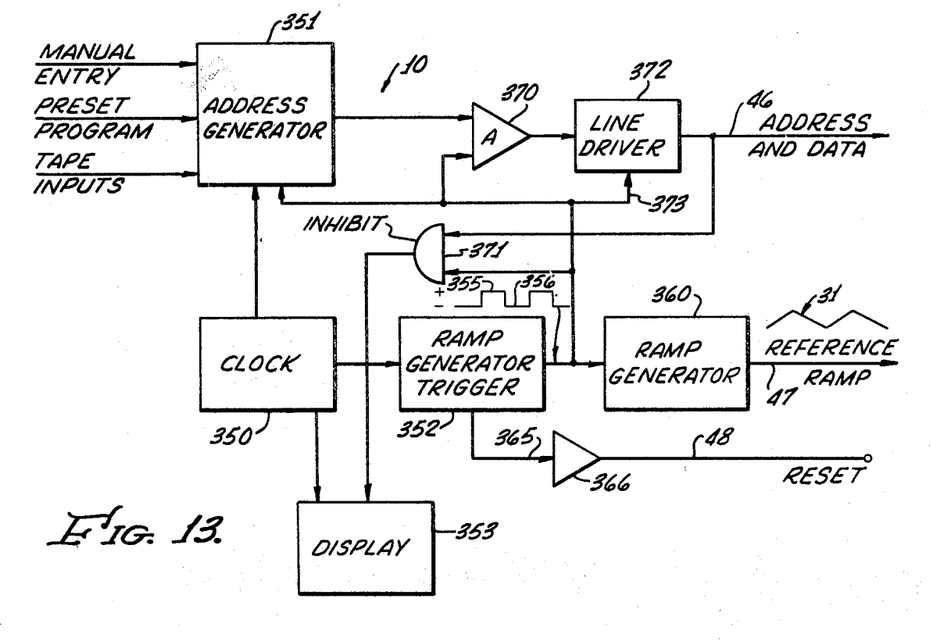
FIG. 13 is a block diagram of the central communicator station.

The overall structure and operation of the central station 10 is illustrated in FIG. 13. The entire unit is synchronized to a common clock 350 which delivers clock pulses to address generator 351, the ramp generator 352 and display 353. The address generator produces the address signal pulses for a particular one or ones of the remote units in accordance with the selection made by any of the three inputs: manual entry, preset program, and tape inputs. In its simplest form, manual entry may consist of a series of ON-OFF switches, typically used for altering the program provided by the other programmed inputs. The preset program and tape inputs provide a means for providing any desired communicating program in which a plurality of remote units are addressed in the desired sequence and in the desired frequency, i.e., some remote communicator units will be called up more frequently than others.

The ramp generator trigger 352 produces a square wave signal having a positive portion 355 equivalent in width to the desired address portion of the communicating sequence and a negative portion equivalent in width to the desired data portion of the sequence. This waveform is applied to the ramp generator 360 which integrates each of the positive and negative waveforms to provide the desired triangular shaped reference ramp 31 on communications cable conductor 47. In addition, the ramp generator trigger produces at the start of each of its positive output pulses a short pulse on output lead 365 which is connected to a driver stage 366 for providing the reset pulse on cable lead 48.

The output waveform of the ramp generator trigger 352 is connected to one input of the address generator 351, one input of AND gate 370, one input of inhibit gate 371, an input of line driver stage 372 and the ramp generator 360. Its function in combination with the address generator is described hereinafter in relation to FIG. 14. The positive portion 355 of this waveform opens AND gate 370 during the address portion of the communicating sequence, permitting the address pulses produced in the address generator 351 to activate the line driver stage 371 and be reproduced on communications cable lead 46. Contrariwise, the positive waveform 355 inhibits gate 371 thus preventing the transmission of any signals on the address and data conductor 46 to the display 353. The square wave output of the ramp generator trigger does not affect the line driver stage 372 during the addressing portion of the communicating sequence.

During the data portion of the communicating sequence, the negative voltage at the output of the ramp generator trigger is applied at input 373 of the line driver, and in response thereto, the latter stage applies a positive potential to the address and and data conductor 46 as shown in FIG. 4a. In addition, the change in level on the output of ramp generator trigger removes the inhibit placed upon gate 371. Thus, any data pulse or pulses produced at a remote unit and transmitted on the address and data conductor 46 will be passed through the inhibit gate 371 and the time duration data decoded at the display 353. Thus, this display responds both to the initiation of the data interval and the grounding of the common conductor 46 for providing a readout of the data acquired during the communicating sequence.

Figure 14:
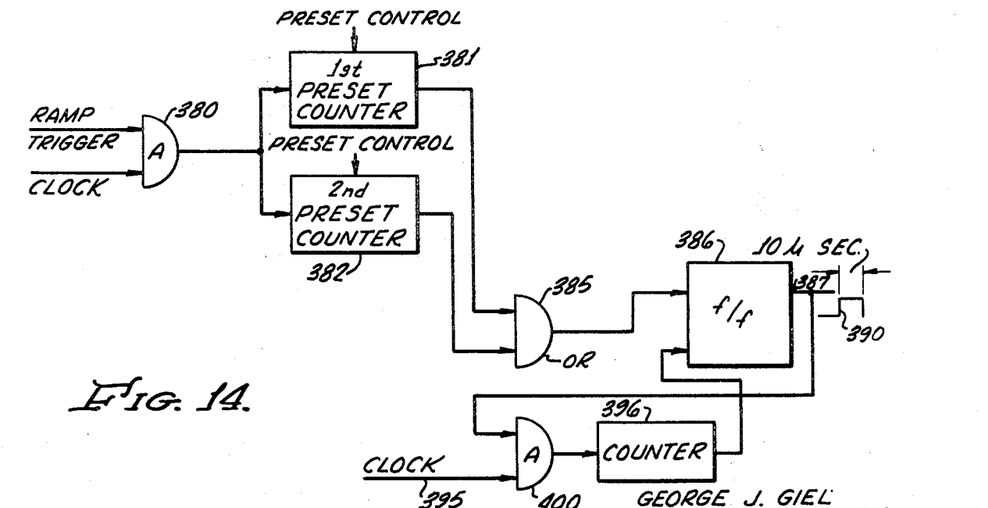
FIG. 14 is a block diagram of the address generator included in the central station of FIG. 13.

The overall operation of the address generator 351 is illustrated in FIG. 14. As shown, the ramp trigger at the output of the ramp generator trigger 352 and clock output are combined in AND gate 380 and applied to respective inputs of preset counter stages 381 and 382. The first preset counter stage 381 sets the first address pulse and the second preset counter stage 382 sets the second address pulse. Preset counters are well-known in the art, commonly employing a series of binary stages and having means for detecting when all of the stages have reached a predetermined value such as, for example, when all of the binary stages are reset. At such time, an output signal is applied through OR gate 385 to the set input of flip-flop 386.

Flip-flop 386 is controlled for achieving an address pulse having a precisely determined width. When flip-flop 386 is triggered to its set state, the output potential on lead 387 rises as shown at 390 and remains at this level until the flip-flop is reset. Reset is provided after a predetermined period of time determined by the clock input 395 and ring counter 396. When flip-flop output 387 rises, AND gate 400 is opened and the ring counter 396 responds to the clock pulses on lead 395. After a predetermined period of time, depending upon the length of the counter stage 396, a pulse is applied at its output to the reset input of flip-flop 386, returning output 387 to ground and closing gate 400. In this manner, an address pulse of precise width such as 10 microseconds is achieved, being dependent only upon the accuracy of the clock 350 at the central station.

In use, the first preset counter is set to provide a first count for positioning the first address pulse with respect to the initiation of the communicating sequence and the second preset counter is set to provide a longer count corresponding to the desired position of the second address pulse. Accordingly, during the address portion of the communicating sequence, the AND gate 380 is opened and the clock applied to both counters. Both counters then count up (or down according to whether forward or reverse counters are employed) until they reach a given predetermined value, thereby producing successive address pulses at a time precisely determined by the initiation of the ramp trigger and the central clock 350.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:
1. In a system for communicating with a plurality of remote units:
   central communicator means for selectively addressing said remote units, said means producing first and second waveforms during a communicating cycle, said first waveform defining a time duration corresponding to the encoding of a selected remote unit, said second waveform varying in amplitude with time in a predetermined manner during a communicating cycle,
   a means for coupling said first and second waveforms produced by said central communicator means to each of said remote units, and
   a plurality of remote communicator units each including:
      amplitude comparator means coupled to said second waveform for comparing said second waveform and a predetermined reference which has a substantially constant amplitude during the address portion of said communicating cycle and producing an output signal defining a time duration in accordance with said comparison, and
      time comparator means coupled to the output signal of said amplitude comparator means and the first waveform of said control means for comparing the time durations defined by said respective signals and producing a communicat- ing control signal when a predetermined time relation exists therebetween.

2. The system described in claim 1 for communicating with a plurality of remote units wherein:

a remote communicator unit acquires analog information and transmits this data information when addressed, said remote unit including signal comparator means coupled to a signal which varies in accordance with said analog information and said second waveform and producing an output signal defining a time duration in accordance with said comparison, said system including means for transmitting said time duration data signal to said central communicator means during a portion of said communicating cycle.

3. The system described in claim 1 for communicating with a plurality of remote units wherein:

a remote communicator unit provides a discrete command when addressed, said remote unit including means responsive to the correlation between the time duration defined by said first waveform and the time duration produced by said amplitude comparator means for producing a discrete command output signal when said remote unit is addressed by said central communicator means.

4. The system described in claim 1 for communicating with a plurality of remote units wherein:

a remote communicator unit provides a proportional command when addressed, said central communicator means providing a data signal to said remote unit which defines a time duration having a predetermined relationship to the desired proportional command, said remote unit including storage means for storing a signal, means responsive to (i) the correlation between the time duration defined by said first waveform and the time duration produced by said amplitude comparator means and (ii) said time duration data signal for coupling said storage means to said second waveform for a time period corresponding to the time duration defined by said data signal when said remote unit is addressed by said central communicator means, and means responsive to said storage means for producing an output signal whose magnitude is proportional to the signal stored therein.

5. The system described in claim 1 for communicating with a plurality of remote units wherein:

said first waveform produced by said central communicator means includes an address pulse occurring a predetermined time duration after the initiation of a communicating cycle in accordance with the encoding of a selected remote unit, said amplitude comparator means produces an output pulse at a time corresponding to a predetermined amplitude comparison between said second waveform and said predetermined reference, and said means for comparing the time durations respectively defined by the output signal of said comparator means and the first waveform of said address means comprises a gating means which provides a signal at its output when the address pulse and the pulse produced at the output of the comparator means are time coincident.

6. The system described in claim 5 for communicating with a plurality of remote units wherein:

said first waveform produced by said central communicator means includes first and second address pulses respectively occurring predetermined time durations after the initiation of a communicating cycle in accordance with the encoding of a selected remote unit, said amplitude comparator means compares said second waveform with first and second predetermined reference signals which remain substantially constant during the address portion of said communicating cycle for producing first and second output pulses at respective times corresponding to a predetermined amplitude between said second waveform and said first and second predetermined references, said means for comparing the time durations respectively defined by the output signal of said comparator means and the first waveform of said address means comprises:

first gating means coupled to said first waveform and the output of said address comparator means for producing an output signal when the first address pulse and the first output pulse of said comparator means are time coincident and second gating means responsively coupled to said first waveform, the output of said address comparator means, and the output of said first gating means for producing an output signal when the second address pulse occurs in time coincidence with the second output pulse of said comparator means.

7. The system described in claim 6 for communicating with a plurality of remote units wheren:

said amplitude comparator means comprises a first address comparator having one input connected to said second waveform and another input connected to said first predetermined reference signal and a second address comparator having one input connected to said second waveform and another input connected to said second predetermined reference signal, said first gating means has an input coupled to the output of said first address comparator and another input coupled to said first waveform and said second gating means has a first input coupled to the output of said second address comparator and a second input coupled to said first waveform, said system further comprising:

bistable means responsively coupled to the output of said first gating means and having an output connected to a third input of said second gating means so that (i) said bistable means is triggered when the first address pulse and the output pulse of said first comparator means are time coincident, and (ii) said second gating means is opened when said first bistable means has been triggered and said second address pulse and the output pulse of said second comparator means are time coincident.

8. The system described in claim 6 for communicating with a plurality of remote units having:

reference selector means responsive to the output of said first gating means for selecting one or the other of said first and second predetermined reference signals which remain substantially constant during the address portion of said communicating cycle, said amplitude comparator means having an input coupled to said second waveform and another input coupled to the output of said reference selector means so that during each cycle, the address comparator initially compares said second waveform with the first predetermined reference and, if an output is produced by said first gating means, subsequently compares the second waveform with said second predetermined reference.

9. The system described in claim 8 for communicating with a plurality of remote units comprising:

bistable means responsively coupled to the output of said first gating means and means coupled the output of said bistable means to the input of said second gating means and said reference selector means so that (i) said bistable means is triggered to its opposite stable state when the first address pulse and the output of said comparator means are time coincident, (ii) said reference selector means produces said second predetermined reference when said bistable means has been triggered, and (iii) said second gating means is opened when said bistable means has been triggered and said second address pulse and the output pulse of said comparator means are time coincident.

10. The system described in claim 1 for communicating with a plurality of remote units wherein:
a constant reference signal is supplied to each of said remote units, said remote units respectively including means for coupling a predetermined portion of said reference signal to said amplitude comparator means as said predetermined reference of substantially constant amplitude, said predetermined portion being compared with said second waveform to produce a time duration function corresponding to the particular address encoding of the remote unit.

11. The system described in claim 6 for communicating with a plurality of remote units wherein:
a constant reference signal is applied to said remote units, said remote units respectively including means for coupling first and second predetermined portions of said reference signal to said amplitude comparator means as said first and second predetermined reference signals of substantially constant amplitude, said predetermined portions being compared with said second waveform to produce a time duration function corresponding to the particular address encoding of the remote unit.

12. The system described in claim 2 for communicating with a plurality of remote units including:
a transmission means coupling said remote unit to said control communicator means and provided with a predetermined signal level during the data portion of the communicating cycle, and
means responsive to the output signal of said signal comparator means for modifying said signal level for a short instant of time.

13. The system described in claim 12 for communicating with a plurality of remote units wherein:
said transmission means comprises a conductor connecting said central communicator means with said remote unit and said means for modifying said signal includes means responsive to the output of said signal comparator means for grounding said conductor for a very short interval of time.

14. The system described in claim 1 for communicating with a plurality of remote units wherein:
a remote communicator unit acquires information from a plurality of analog sources and transmits this data information when addressed, said remote unit comprising a plurality of signal comparator means responsively coupled to said second waveform and to respective ones of signals which vary in accordance with said analog sources, said comparator means producing respective output signals each defining a time duration in accordance with said comparison, said system including means for transmitting said time duration data signals to said central communicator means during a portion of said communicating cycle.

15. The system described in claim 1 for communicating with a plurality of remote units wherein:
a remote communicator unit selectively acquires information from a plurality of analog sources, said remote unit comprising:
a signal comparator means having one input responsively coupled to said second waveform, switch means for selectively connecting another input of said signal comparator means to signals which vary in accordance with said analog sources, and
means operatively coupling said switch means to the output of said time comparator means so that said switch means is operated each time a communication control signal is produced.

16. The system described in claim 5 for communicating with a plurality of remote units wherein:
said central communicator means maintains the width of said address pulse at a substantially constant value to provide a predetermined time tolerance at each remote communicator unit, during which time the output pulse of said amplitude comparator means can vary without adversely affecting the addressability of its associated remote unit.

17. A data acquisition unit for acquiring data during a data acquisition cycle comprising:
an amplitude comparator having one input coupled to an analog data source and another input coupled to a time-varying reference signal recurring during each data acquisition cycle and providing an output signal when the magnitudes of the analog signal and reference signal are equal, the amplitude of said reference signal varying in a predetermined manner from one polarity to the opposite polarity during each data acquisition cycle and passing through zero amplitude a predetermined time period after the initiation of the data acquisition cycle, and
means responsive to the output signal of said amplitude comparator for producing a time duration signal defined by the initiation of said data acquisition cycle and the occurrence of an output signal from said amplitude comparator so that a time duration signal of predetermined length is produced for a zero-valued analog data signal.

18. In a data communicating system:
a plurality of remote communicator units including a data acquisition unit and a command unit, said data acquisition unit including means responsively coupled to a transmission means and a source of analog data signals for translating the analog signal supplied by said source of analog data signals into a data signal on said transmission means when a predetermined address signal is applied to said transmission means during a communicating cycle, said command unit including means responsively coupled to said transmission means for translating a data signal on said transmission means into an analog signal at its output when said predetermined address signal is applied to said transmission means during a monitoring cycle, and
central communicator means coupled to each of said plurality of remote communicator units for selectively addressing said units, said means producing a plurality of discrete address signals including said predetermined address signal so that when said predetermined address signal is applied to said transmission means during a communicating cycle, said data acquisition unit and said command unit are both responsive thereto to produce a command function at said command unit directly proportional to the analog data signal coupled to said data acquisition unit.

19. In a system for communicating with a plurality of remote units:
communicator means for selectively addressing said remote units, said means producing first and second waveforms during a communicating cycle, said communicating cycle having both an address portion and a data portion, said first waveform including an address pulse occurring a selectively-varied time duration after the initiation of the address portion of said communicating cycle, said time duration corresponding to the encoding of a selected remote unit, the amplitude of said second waveform varying as a predetermined triangular waveform having a leading ramp during the address portion of each address cycle and a trailing ramp during the data portion of each communicating cycle,
means for communicating said first and second waveforms produced by said communicator means to each of said remote units, and a plurality of remote units each including:

amplitude comparator means coupled to said second waveform and to a predetermined reference voltage for producing an output pulse during the address portion of said communicating cycle when said reference voltage and leading ramp of said triangular waveform are equivalent in amplitude, and time comparator means coupled to the output of said amplitude comparator means and said first waveform for comparing the time durations defined by the address pulse and the amplitude comparator output pulse and producing a communicating control signal at said remote unit when said pulses are time coincident.

20. A data communicating system comprising:

a central communicator station for receiving data encoded in a time duration format from a plurality of selectively addressable remote communicator units, said remote units being coupled to said central station by a common conductor, means in said central station for providing a substantially continuous signal over said common conductor during a data portion of each communicating cycle, means included with each of said remote units for grounding said common conductor for a very short time interval to produce a pulse on said common conductor, the position of said pulse relative to the initiation of the data interval defining a selectively variable time duration, and means included with said central station responsive to the initiation of the data interval and the grounding of said common conductor for decoding the data communicated from the addressed remote unit.

21. The data communicator system described in claim 20 including:

protection means included with a remote unit in circuit with said grounding means, said protection means being responsive to a ground condition existing for a substantial period during said data portion for electrically disconnecting said remote unit from said common conductor.

22. The data communicator system described in claim 20 wherein:

said protection means is a fuse in series circuit between said common conductor and said grounding means of said remote unit, said fuse having a sufficiently high rating such that it does not blow during the low duty cycle of a data pulse produced by said grounding means but does blow if the grounding means applies a ground for a substantial duty cycle of the data portion of the communicating cycle.

References Cited

UNITED STATES PATENTS 3,336,444  8/1967  Piechocki.
3,445,813  5/1969  Price _______________ 340—150

THOMAS B. HABECKER, Primary Examiner

M. SLOBASKY, Assistant Examiner

U.S. Cl. X.R.

325—55; 340—150, 163

PO-1050
(5/69)

UNITED STATES PATENT OFFICE
CERTIFICATE OF CORRECTION

Patent No. 3,518,628        Dated June 13, 1970

Inventor(s) George J. Giel, Lawrence S. Smith, Robert D. Villwock

It is certified that error appears in the above-identified patent and that said Letters Patent are hereby corrected as shown below:

```
Col.  4  -  line 56  -  "Adderss" should be --Address--
Col.  8  -  line 63  -  "swich" should be --switch--
Col.  9  -  line 35  -  "dress" should be --address--
Col.  9  -  line 61  -  after "address" and before "will"
                        add the word --pulse--
Col. 12  -  line 24  -  "elad" should be --lead--
Col. 13  -  line 14  -  after second "generator" and before
                        "352" insert the word --trigger--
Claim 17 -  line 28  -  after "duration" insert the word --data--
```

SIGNED AND SEALED
DEC 1 - 1970

(SEAL)
Attest:

Edward M. Fletcher, Jr.
Attesting Officer

WILLIAM E. SCHUYLER, JR.
Commissioner of Patents